United States Patent Office 3,513,110
Patented May 19, 1970

3,513,110
OPEN-CELLED LOW DENSITY FILAMENTARY MATERIAL
Herman D. Noether, Short Hills, N.J., assignor to Celanese Corporation, New York, N.Y., a corporation of Delaware
No Drawing. Filed Oct. 1, 1965, Ser. No. 492,328
Int. Cl. C08g 53/08, 39/04, 41/00
U.S. Cl. 260—2.5     7 Claims

ABSTRACT OF THE DISCLOSURE

Open-celled low density filamentary material composed of high molecular weight linear polycarbonamides or high molecular weight linear polyesters are prepared by melt extruding, drawing down at a draw down ratio above 200 to achieve orientation, raising the crystallinity by a solvent or heat treatment, stretching, and, while the filaments are in a stretched condition, annealing. The low density properties of the filamentary material are attributable to an open-celled structure of extremely fine porosity in which the entrance passageways of the cells are no larger than about 5000 angstrom units, e.g., 150 to 5000 angstrom units.

This invention relates to novel, relatively low density filamentary materials and a process of producing them.

Man-made shaped articles, e.g. filamentary materials, composed of high molecular weight linear polycarbonamides such as polyhexamethylene adipamide, polyhexamethylene sebacamide, and polycaprolactam, or high molecular weight linear polyesters such as polyethylene terephthalate, are well known in the art. These materials have many and varied uses including the production of yarns for woven and knitted fabrics used in the manufacture of apparel and home furnishings such as carpet and drapes, industrial uses such as tire cord, and various specialized uses such as laminated structures used, for example, in the production of leather substitutes. These conventional materials generally have a low degree of elasticity and densities which range from about 1.16 g./cc. for polycarbonamides to about 1.35–1.4 g./cc. for polyesters.

Although these previously described materials having conventional densities are in wide use, there exist other possible applications for filamentary materials wherein somewhat different properties would be desirable. For example, fibers having substantially lower densities than those heretofore obtained would be very useful in products requiring a high degree of bulk or cover and relatively low weight, e.g. woven or knitted fabrics for apparel requiring a high degree of insulation from heat or cold, fiberfill applications requiring a high degree of insulation, e.g. in sleeping bags and quilts, and as a general insulation material. Moreover, synthetic materials of particularly low density have the economic advantage that they may be often used for the same purposes as materials of conventional densities but with the employment of a much lower weight of material.

In accordance with one aspect of the invention, a novel class of fibers composed of a high molecular weight linear polycarbonamide or polyester is provided having a significant degree of crystallinity, an open-celled structure with small cells, e.g. smaller than those which can be measured by an optical microscope, and apparent densities significantly lower than the apparent densities of corresponding articles composed of the same polymer but having substantially no open-celled or other voidy structure ("apparent density" being the weight per unit of "gross volume" of the fibers, where "gross volume" is the product of the measured length of the weighed fiber and the average cross-sectional area of the fiber as calculated on the basis of measurements made with an optical microscope). The term "open-celled structure" signifies that the major portion of the void or pore space of such structure within the geometric confines of the shaped article is accessible to the outside geometric surfaces of the article.

The fibers in a tensionless state have apparent densities lower than the densities of the polymer materials from which they are formed, usually no greater than about 90 percent, and preferably about 60 to 85 percent of the densities of the corresponding polymer materials, and the sizes of the passageways to the void or pore space of the open-celled structure accessible to the outside surfaces of the fiber are under 5000 angstrom units, e.g. 150 to 5000 angstrom units, as porosimetrically determined by mercury penetration, which measurement also determines the volume of such void or pore space. The final crystallinity of the polymer making up the shaped articles is preferably at least 50 percent, more preferably 60 to 90%, and an average crystallite size of at least 50, preferably 60 to 300 angstroms.

In accordance with another aspect of the invention, the foregoing polycarbonamide (nylon) or polyester shaped articles of relatively low density are produced by subjecting a shaped article, e.g. a filament of the polymer having a higher than usual extrusion (spin) orientation, to treatment with a swelling agent and/or heat to develop or increase the crystallinity, stretching the material in the direction of extrusion, and while the material is in such stretched state, annealing it at an elevated temperature, up to the melting point of the polymer.

The extrusion (spin) oriented shaped article, e.g. filamentary material of polycarbonamide or polyester which is subjected to the action of a swelling agent may be obtained by first melt extruding the polycarbonamide or polyester, e.g. through the orifices of a spinneret to form filaments which are initially taken up at a relatively high "drawdown" or "spin draw" ratio (defined as the ratio of initial take-up speed of the filaments to the linear rate of extrusion through the orifices), e.g. at least 200, preferably 200 to 2000. In ordinary melt spinning processes using conventional melt viscosities and pressures on the upstream side of the spinneret, the material take-up speeds necessary to accomplish these high drawdown ratios are generally at least 500 meters/min., preferably about 1000 to 4000 meters/min.

These high drawdown ratios cause the production of oriented filaments and in some cases result in filaments having some degree of crystallinity.

To develop or raise the crystallinity of the filaments, a subsequent treatment of the as spun filaments involving the action of a swelling agent and/or heat is carried out. In the case of polycarbonamide, this treatment is desirably a treatment with a swelling agent. The swelling agent is conveniently an aqueous solution of a water-miscible solvent for polycarbonamides, e.g. a phenol, cresol or formic acid, having a concentration, for example, of 1 to 5% by weight of the solvent. The filaments on the bobbin may be immersed in the aqueous solution, for example, at a temperature of 25 to 120° C. for a period of 2 min. to 2 hrs. Alternatively the filaments may be exposed to an atmosphere containing solvent vapors at an elevated temperature for a similar period. After the treatment with aqueous solution of solvent or solvent vapors, the material is preferably washed and dried before stretching and annealing.

The treatment with swelling agent generally results in a development or increase of the percent crystallinity of the polycarbonamide to at least 50% preferably 60 to 90% and of the average crystallite size to at least 50, preferably 75 to 200 angstroms.

In the case of polyester filaments, the crystallinity of the as spun material is preferably developed or increased by heat treating the material at a temperature above 100° C., preferably 150 to 220° C. in the unstretched state.

This may be accomplished by passing the material through a heated sheath or tube which is radiating heat at the desired temperature. Optionally, and before or after the heat treatment, the polyester filaments may also be given a treatment with swelling agent, e.g. aqueous solution of a solvent for the polyester.

The foregoing heat treatment and swelling agent treatment of polyester if used are sufficient to develop or increase the percent crystallinity of the polymer in the shaped article to at least 50 preferably 60 to 70% and the average crystallite size to at least 50, preferably 60 to 150 angstroms.

The foregoing swelling and/or heat treatments have the effect of improving the crystal structure of the treated fiber, e.g. by increasing the size of the crystallites and removing imperfections.

The stretching of the fiber may be carried out at any temperature below the melting point of the fiber-forming polymer. In most cases but not all, this will be above the glass transition temperature of the polymer. Preferably, the stretching temperature used with a polycarbonamide article is above 60° C. and that used with polyester is above 100° C.

The heat treatment of the fibers in the stretched state should be carried out at a temperature between about 60° C. and the melting point of the fiber. The stretching operation and the heat treatment may be carried out sequentially or they may be combined in a single operation, e.g. by stretching the fiber over a metal surface heated to the required temperature.

The treated article, e.g. fiber, to be subjected to the heat treatment may be extended up to about 90 percent of their breaking elongation at the stretching temperature, preferably within the range from about 25 percent of the unstretched length to about 75 percent of the breaking elongation. The period of heat treatment should be longer than 0.1 second and may be within the range of about 0.5 second to 30 minutes, preferably about 2 seconds to 15 minutes. As may be surmised from the foregoing discussion, the apparent density of the heat-treated low density fiber is significantly below that of the precursor fibers.

When the swelling agent and/or heat treated material having a significant degree of crystallinity and spin orientation and in some case elasticity is subjected to a degree of stretch below its breaking point preparatory to the heat treatment in the stretched state, the ratio of the total gross volume of the strecthed fiber to that of the unstretched fiber is significantly greater than one. This is not typical since the ratio of total gross volume of a given mass of a fiber of an elastic material such as rubber or spandex in the stretched state to that of the fiber in the unstretched state has been found to be substantially one, i.e. there is no increase of total gross volume of these fibers when they are stretched. Moreover, this behavior is distinct from that which occurs when a conventional fiber of nylon or polyester, is inelastically stretched, i.e. "cold drawn," for the purpose of increasing orientation of the fiber, in which case the ratio of total gross volume of stretched to unstretched material is sometimes less than one, i.e. the apparent density of the stretched fiber in these cases is higher than that of the unstretched fiber. Expressed another way, the diameter of an elastic fiber of rubber or spandex, or of a conventional fiber of nylon or polyester which is stretched to increase orientation, decreases on stretch to the extent that the length of the fiber increases so that the total gross volume of the stretched fiber is approximately equal to or less than that of the unstretched fiber. This is in contrast to what occurs when a spin oriented crystalline fiber contemplated by this invention is stretched. The decrease in the diameter of such a fiber on stretch is smaller than usual and such decrease in diameter does not make up for the length increase on stretch, so that the total gross volume of the stretched fiber is substantially higher than that of the unstretched fiber. As the total gross volume of the fiber being stretched increases, its apparent density decreases proportionately.

Moreover, if the stretching tension on the relatively crystalline fibers as described in the preceding paragraph is released, the gross volume and apparent density of the fibers at least partially revert back to those of the fibers in the unstretched state. That is to say, the gross volume increase and apparent density decrease are somewhat reversible. However, it has been found that, if these fibers are heat treated properly in the stretched state, they may be stabilized so as to maintain their high gross volume and low apparent density characteristics after the stretching tension is removed.

The low density filamentary polycarbonamide material of the invention, e.g. polyhexamethylene adipamide, may be prepared, for example, by stretching the swelling agent treated precursor material to an extension having a value up to 75 percent of its breaking elongation at the temperature of its stretch, preferably 50 to 200 percent of its unstretched length, and while it is in such stretched state, heat treating or "annealing" the material at a temperature in the range of from about 70 to 160° C. for a suitable period, usually about 1 to 60 minutes. This heat treatment has the effect of eliminating the stress in the material caused by stretching and results in a geometrically stable fiber having a density below about 1.1 g./cc. and generally in the range of about 0.8 to 1.05 g./cc. Moreover, the material which is heat treated in the stretched state has a percent crystallinity and average crystallite size at least equal to that of the swelling agent-treated precursor material. In some cases, a heat treatment of nylon in the relaxed state, i.e., before the swelling agent treatment and before heat treatment in the stretched state, may be carried out to further develop or increase the crystallinity of the material.

Low density fibers of a polyester such as polyethylene terephthalate contemplated under the invention may be prepared by stretching the heat treated material up to about 90 percent of its breaking elongation, preferably to an extension in the range of about 50 to 200 percent of its unstretched length, and while it is in such stretched state, heat treating the fiber at a temperature in the range of about 120 to 200° C. for a suitable period, usually about 1 to 60 minutes. As is the case with polycarbonamides, this heat treatment has the effect of eliminating the stress in the material caused by stretching and results in a geometrically stable fiber having an apparent density lower than the density of the polymer and preferably in the range of about 1.1 to 1.3 gram per cubic centimeter. Moreover, the polyester material after heat treatment in the stretched state has a percent crystallinity and average crystallite size at least equal to that of the precursor subjected to such treatment.

The low apparent densities of the fibers of this invention are not caused by the presence of relatively large voids in the material. Thus, such low density fibers generally have substantially no voids which are greater than 5000 angstrom units, as porosimetrically determined by mercury penetration. Polycarbonamide and polyester fibers of open-celled structure in which the passageways of the cells leading to the fiber surface are no larger than about 1000 angstroms may be produced.

The heat treatments referred to above may be carried out, for example, in an oven heated to the appropriate temperature. Alternatively, the heat treatments may be applied in a continuous run of the yarn or bundle of filaments. Such heat treatment may be by means of hot fluid, e.g. in a jacketed tube or shroud, by infrared rays, by dielectric heating or by direct contact of the running yarn or bundle with a heated metal surface, preferably curved to make good contact.

For the heat treatment of the material without stretch, the material may be wound on a bobbin under substantially no stress and subjected to heat treatment in that form or the material may be in substantially loose state, e.g. as a skein of continuous filaments.

For heat treatment of material in the stretched state, the material may be stretched on a conventional draw frame and rewound on a bobbin and subjected to heat treatment in that form, or the material may be stretched and heat treated in the continuous fashion by means of two sets of driven rolls traveling at different speeds with the material between the rolls passing through a heated tube or over a heated metal surface.

The following examples further illustrate the invention:

EXAMPLE I

A fiber-forming polyhexamethylene adipamide is extruded at a temperature of 300° C. through a spinnerette having 20 holes of 15 mil diameter and 15 mil length to form filaments which are taken up at a speed of 1500 meters per minute and a drawdown ratio of 575. These filaments which are oriented, and have a percent crystallinity of 45% and an average crystallite size of 35 angstroms are wound up on a bobbin and immersed in an aqueous solution of 5 wt. percent of phenol at 95° C. for 120 minutes, following which the filaments are washed and dried.

The treated filaments which have a percent crystallinity of 66, an average crystallite size of about 75 angstroms, and an elastic recovery from 50% extension of 33%, are stretched to an extension of 100% of their original length at a temperature of 100° C. and while in the stretched state are annealed at a temperature of 120° C. for a period of 30 minutes.

The filamentary product has an apparent density of about 1 g./cc., an open-celled structure with cells having dimensions no greater than about 3000 angstroms as porosimetrically determined by mercury penetration, and a percent crystallinity and average crystallite size which are about the same as those of the swelling agent-treated precursor material.

EXAMPLE II

The procedure of Example I is repeated except that the polymer is a fiber-forming polycaprolactam which is extruded at a temperature of 255° C. through a spinneret having 17 holes of 30 mil diameter and 300 mil length to form a highly spin oriented product which is taken up at a speed of about 1500 meters per minute at a drawdown ratio of about 1500, and 3% aqueous phenol is used after treatment with which the percent crystallinity is increased to about 60% and the average crystallite size to 75 angstroms.

The filamentary product after heat treating in the stretched state has a density of 1.08 g./cc., an open-celled structure with the dimensions of the cells no larger than about 3000 angstroms, a percent crystallinity of about 60% and an average crystallite size of about 75 angstroms.

EXAMPLE III

The procedure of Example I is repeated except that the polymer is a fiber-forming polyethylene terephthalate which is extruded at a temperature of 300° C. and taken up at a speed of 2000 meters/min. at a drawdown ratio of about 1000 to obtain a highly spin oriented material. Moreover, the treatment with aqueous phenol is omitted and instead, the as spun filaments are heated at 200° C. for 30 minutes before stretching, during which the percent crystallinity is developed to 63% and the average crystallite size developed to about 75 angstroms.

The heat treated filaments are stretched, i.e. to an extension of 200% of the initial length at a temperature of 150° C. and the filaments in the stretched state are annealed at a temperature of 170° C. for a period of 30 minutes.

The product has an apparent density less than 85% of the density of the as spun material, an open-celled structure with the cells no larger than 3000 angstroms as determined by mercury penetration, and a percent crystallinity and average crystallite size equal to those of the material before stretching and annealing.

The term "fiber" as used in this specification includes continuous filaments, staple fibers, yarns made from the latter materials and tows.

The values of elastic recovery given above are determined with the Instron Tensile Tester at a strain rate of 100 percent/minute. After the yarn is extended to the desired strain value, the jaws of the Instron are reversed at the same speed until the distance between them is the same as at the start of the test, i.e., the original gauge length. The jaws are again reversed after two minutes and are stopped as soon as the stress begins to increase from the zero point. The elastic recovery is then calculated as follows:

$$\text{Elastic recovery} = \frac{\text{Total length when extended} - \text{Final distance between jaws}}{\text{Length added when extended}} \times 100$$

Measurements with the Instron at room temperature 25° C. are carried out in air at 65 percent relative humidity.

The values of percent crystallinity given above are determined using the procedure analogous to the one described in an article by R. G. Quynn et al. in Journal of Applied Polymer Science, vol. 2, No. 5, pages 166–173 (1959).

The values of average crystallite size given above are determined as described in chapter 9 of Klug and Alexander, "X-Ray Diffraction Procedure," John Wiley (1954).

The term "porosimetrically determined by mercury penetration" means that the open-celled nature of the structure and the approximate size of the passageways of the pores or voids making up such structure to the surface are determined with a porosimeter as described in an article by R. G. Quynn in the Textile Research Journal, vol. 33, pages 21 et seq. (1963).

It is to be understood that the foregoing detailed description is given merely by way of illustration and that many variations may be made therein without departing from the spirit of the invention.

The embodiments of the invention in which an exclusive property or privilege is claimed are defined as follows:

1. A filamentary polycarbonamide material having in the tensionless state a percent crystallinity of at least 60%, an average crystallite size of at least 60 angstroms, an open-celled structure in which the entrance passageways of the cells are no larger than about 5000 angstroms as porosimetrically determined by mercury penetration, and an apparent density no greater than 1.1 grams per cubic centimeter, produced by, melt extruding a high molecular weight linear polycarbonamide to form filaments, taking up said filaments at a drawdown ratio of at least 200 such that they are in an oriented state, immersing said filaments in a dilute aqueous solution of a water-miscible solvent for said polycarbonamide for a time sufficient to raise the percent crystallinity of the polymer to at least 50% and its average crystallite size to at least 50 angstroms, stretching the filaments to an extension up to 200% to produce stretched filaments having an open-celled structure in which the entrance passageways are no larger than 5000 angstroms as porosimetrically determined by mercury penetration, and while the filaments are in stretched condition annealing them at a temperature of from 70° C. up to the melting point of the polycarbonamide.

2. A filamentary polycarbonamide material having in the tensionless state a percent crystallinity of at least 60%, an average crystallite size of at least 75 angstroms, an open-celled structure in which the entrance passageways of the cells are no larger than about 5000 angstroms as porosimetrically determined by mercury penetration, and an apparent density in the range of about 0.8 to 1.05 grams per cubic centimeter, produced by melt extruding a high molecular weight linear polycarbonamide to form filaments, taking up said filaments at a drawdown ratio of at least 200 such that they are in an oriented state, immersing said filaments in a dilute aqueous solution of a water-miscible solvent for said polycarbonamide for a time sufficient to raise the percent crystallinity of the polymer to at least 50% and its average crystallite size to at least 50 angstroms, stretching the filaments to an extension up to 200% to produce stretched filaments having an open-celled structure in which the entrance passageways are no larger than 5000 angstroms as porosimetrically determined by mercury penetration, and while the filaments are in stretched condition, annealing them at a temperature of from 70° C. up to the melting point of the polycarbonamide.

3. The material of claim 2 wherein said polycarbonamide is polyhexamethylene adipamide.

4. The material of claim 2 wherein said polycarbonamide is polycaprolactam.

5. A filamentary polyester material having in the tensionless state a percent crystallinity of at least 50%, an average crystallite size of at least 50 angstroms, an open-celled structure in which the entrance passageways of its cells are no larger than about 5000 angstroms as porosimetrically determined by mercury penetration, and an apparent density no greater than 1.3 grams per cubic centimeter produced by melt extruding a high molecular weight linear polyester to form filaments, taking up said filaments at a drawdown ratio of at least 200 such that they are in an oriented state, heat treating said filaments in the unstretched state at a temperature of about 150 to 220° C. to raise their percent crystallinity to at least 50% and their average crystallite size to at least 50 angstroms, stretching the filaments to an extension up to 200% of their unstretched length to produce stretched filaments having an open-celled structure in which the entrance passageways are no larger than 5000 angstroms as porosimetrically determined by mercury penetrations and while the filaments are in stretched condition, annealing them at a temperature of from 120° C. to the melting point of the polyester.

6. A filamentary polyester material having in the tensionless state a percent crystallinity of at least 60%, an average crystallite size of at least 60 angstroms, an open-celled structure in which the entrance passageways of the cells are no larger than about 5000 angstroms as porosimetrically determined by mercury penetration, and an apparent density in the range of about 1.15 to 1.30 grams per cubic centimeter, produced by melt extruding a high molecular weight linear polyester to form filaments, taking up said filaments at a drawdown ratio of at least 200 such that they are in an oriented state, heat treating said filaments in the unstretched state at a temperature of about 150 to 220° C. to raise their percent crystallinity to at least 50% and their average crystallite size to at least 50 angstroms, stretching the filaments to an extension up to 200% of their unstretched length to produce stretched filaments having an open-celled structure in which the entrance passageways are no larger than 5000 angstroms as porosimetrically determined by mercury penetration, and while the filaments are in stretched condition, annealing them at a temperature of from 120° C. to the melting point of the polyester.

7. The material of claim 6 wherein said polyester is polyethylene terephthalate.

References Cited

UNITED STATES PATENTS

| 2,880,057 | 3/1959 | Cuculo. |
| 3,325,342 | 6/1967 | Bonner. |
| 3,215,486 | 11/1965 | Hada et al. |

SAMUEL H. BLECH, Primary Examiner

W. J. BRIGGS, Sr., Assistant Examiner

U.S. Cl. X.R.

260—75, 78; 264—210, 290, 346